United States Patent [19]

Mulholland

[11] Patent Number: 4,458,936

[45] Date of Patent: Jul. 10, 1984

[54] DRAG REDUCING FAIRING FOR TRUCKS, TRAILERS AND CARGO CONTAINERS

[76] Inventor: Frank J. Mulholland, Box 916, Amagansett, N.Y. 11930

[21] Appl. No.: 333,759

[22] Filed: Dec. 23, 1981

[51] Int. Cl.³ .............................................. B62D 35/00
[52] U.S. Cl. ................................................ 296/1 S
[58] Field of Search ........................ 296/1 S; 180/903

[56] References Cited

U.S. PATENT DOCUMENTS

| | | | |
|---|---|---|---|
| 2,737,411 | 3/1956 | Potter | 296/1 S |
| 2,781,226 | 2/1957 | Tydon | 296/1 S |
| 3,425,740 | 2/1969 | DeVaughn | 296/1 S |
| 4,006,932 | 2/1977 | McDonald | 296/1 S |
| 4,142,755 | 3/1979 | Keedy | 296/1 S |
| 4,236,745 | 12/1980 | Davis | 296/1 S |
| 4,257,641 | 3/1981 | Keedy | 296/1 S |

Primary Examiner—David M. Mitchell
Assistant Examiner—Ross Weaver

[57] ABSTRACT

A compact rear fairing to reduce the drag incident to relatively high speed movement of box-like bodies, such as trucks, trailers and cargo containers, is provided. The structure of the fairing is substantially rigid and, depending on the use thereof, is formed with two or more outer surfaces shaped in the contour of the upper surfaces of an air foil, the leading surfaces of which are mountable adjacent the rear of the box-like body and the trailing surfaces thereof being joined together to form an apex at its rear.

The fairing is readily mounted on and detached from the box-like bodies and interchangeable between trucks, trailers, and containers of the same size.

11 Claims, 20 Drawing Figures

4,458,936

DRAG REDUCING FAIRING FOR TRUCKS, TRAILERS AND CARGO CONTAINERS

This invention relates to a rear fairing to reduce the drag incident to relatively high speed movement of box-like bodies, such as trucks, trailers and cargo containers to save fuel and thereby reduce the cost of operation during transport of the box-like body.

BACKGROUND OF THE INVENTION

It is well-known in the prior art that there is a considerable drag induced by the flat rear box-like ends of trucks and trailers, particularly when operated at relatively high speeds, such as 55 miles per hour and higher. When such vehicles are operated on a long haul over considerable distances, the excess fuel consumed due to the drag created by the structure of the vehicle becomes a major item of expense, especially when one considers the cost of fuel at the present time.

This problem, however, is not limited to the trucking industry. The railroads, in an effort to compete with the trucking industry, have resorted to use of piggyback railroad cars to transport trailers and cargo containers, also at relatively high speeds. The trailers and cargo containers so transported on specially designed articulated railroad cars for the trailer or flat bed cars for the cargo containers present the same problem faced by the trucking industry with respect to drag during relatively high speed movement and subsequent fuel consumption.

While various means have been proposed in the prior art to attack this problem, none have so far gained universal acceptance, if any. Flat-backed trucks, trailers and cargo containers continue to cruise the roads without regard to the drag they create.

It is an object accomplished by this invention to provide improved means to reduce the drag incident to relatively high speed movement of box-like bodies, such as trucks, trailers, cargo containers, and the like.

A further object is to reduce the drag incident to such movement by providing a rear fairing for such uses and shaped according to aerodynamic principles, yet practically adapted to the desired use.

SUMMARY OF THE INVENTION

The foregoing and other objects of the invention are accomplished by providing a fairing for the rear end of a truck, trailer or cargo container which has two or more outer surfaces shaped to approximate the upper surface of an airfoil and facilitate smooth, two and three dimensional air flow, depending upon the design of the fairing and its environment of use, without flow separation, thereby reducing the drag to a minimum.

More specifically, the fairing of the present invention preferably is detachably affixed to the rear end of a truck, trailer body or cargo container by means hereinafter described.

The reduced wind drag created by the fairing results in a corresponding decrease in the horse power required by the truck, trailer tractor, or railroad car, and therefore an increase in the miles traveled per gallon of fuel used. While the fuel consumption will obviously vary with the design of the fairing, the intended use and the conditions of use, it is nevertheless to be noted that a considerable savings in fuel consumption of the propelling engine can be achieved by use of the fairing of the present invention.

Considering the substantial number of trailers and trucks used in the industry, and the miles traveled by each, it is clear that a savings of even 10% represents most significant energy and cost saving.

To accomplish the foregoing objectives, the present invention utilizes aerodynamic principles in the formation of the outer surfaces of the fairing.

Essentially, two embodiments of the fairing are contemplated:

The first comprises a rear fairing in which two upright side walls are aerodynamically contoured and terminate in a vertical apex, the top and bottom walls thereof being substantially flat. This embodiment particularly adapted for use on the rear ends of piggyback containers and truck trailers transported on flat bed railroad cars, especially between cars, but of course, can be used as well on other vehicles, such as self-propelled trailors and trucks.

The second embodiment comprises a rear fairing in which two upright side, top and bottom walls are aerodynamically contoured and terminate in a vertical apex. This embodiment is particularly adapted for use on the rear ends of self-propelled trucks and trailer bodies transported over the road by trailer trucks, and also on the most rear end of a succession of trailer bodies transported on piggyback railroad cars. This is the most preferred embodiment of the invention.

The fairing of this invention is particularly designed for detachable mounting on the rear end of trucks, trailers and cargo containers, thereby providing more flexibility in adaptation of the structure for various uses and conditions of use. For this purpose, a number of means for attachment of the fairing to such box-like bodies are hereinafter described.

DETAILED DESCRIPTION OF THE INVENTION

The invention will be more fully understood by the following detailed description and the appended drawings in which.

Figure 1:
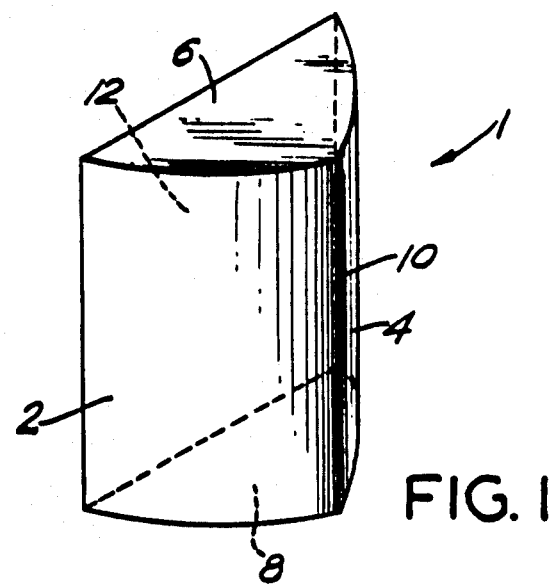
FIG. 1 is a schematic view in perspective from the rear end of a fairing illustrating the first embodiment described above.

As indicated above, FIG. 1 is a schematic view of a first embodiment of the fairing 1 of this invention, in which the upright side walls 2 and 4 are aerodynamically contoured and the top 6 and bottom 8 are substantially flat surfaces, all surfaces terminating rearwardly of the fairing in a vertical apex 10. The forward portion 12 adjacent the box-like body is preferably open to reduce the weight of the fairing, but could be sealed by a substantially flat vertical wall to reinforce the structure and prevent passage of air thereinto during transportation. This applies to the forward portion 12 of FIG. 2 which also may be enclosed by a wall, not shown.

While the fairing of embodiment of FIG. 1 may advantageously be affixed to the rear end of a truck or trailer to reduce drag, because of its flat top and bottom surfaces and the height of truck and trailer bodies, it is more functionally adapted for use on the rear ends of containers transported on flat bed piggyback railroad cars, especially between cars with the flat bottom surface at about the same level as the upper surface of the flat bed car and the flat upper surface being in substantially the same plane as the top of the container on the next succeeding rear car.

Figure 2:
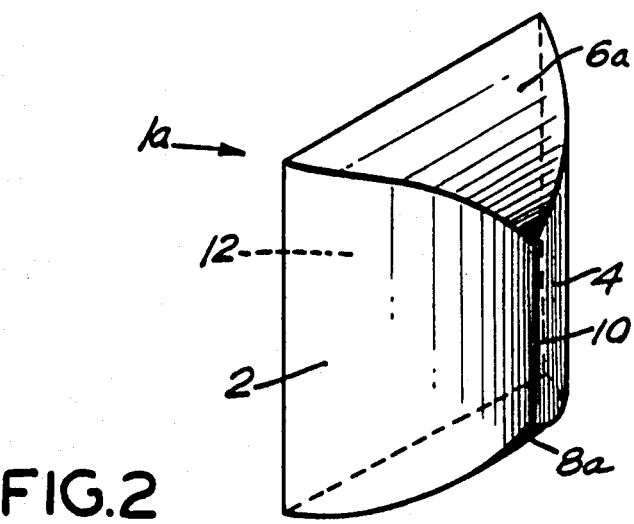
FIG. 2 is a similar view of the second and preferred embodiment.

The embodiment of FIG. 2, which is the most preferred and most universally adaptable fairing of the invention, is provided with aerodynamically contoured surfaces on top 6a, bottom 8a, and sides 2, 4 also terminating in a rear vertical apex 10. This design facilitates three dimentional air flow without flow separation and thereby reduces air drag to a most significant extent.

As pointed out, it is the essence of the invention that various surfaces of the fairing are aerodynamically contoured. By this is meant, that unlike many prior art proposals to "streamline" the rear of trailer bodies and the like, the present invention makes use of aerodynamic principles for contouring the surfaces of the rear fairing 1. This is accomplished by shaping the surfaces, at least in part, in the form of the top surface of an airfoil which is highly cambered and exhibits a high thickness ratio.

Figure 3:
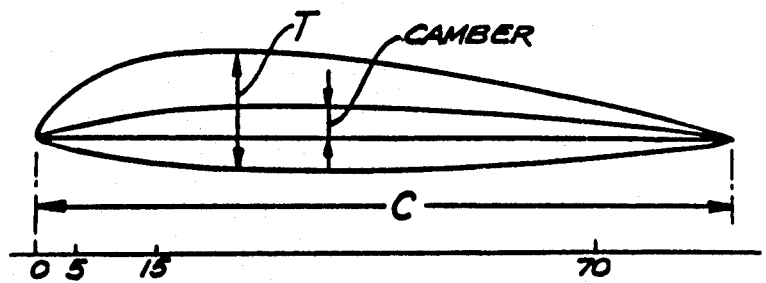
FIG. 3 is a schematic view of a representative airfoil illustrating the basic terminology in describing airfoils.

A typical airfoil is illustrated in FIG. 3. The chamber is the upward bending of the mean line of the airfoil and is expressed in percent of the chord length C of the airfoil as shown in FIG. 3. The thickness ratio is the maximum distance T between the upper and lower surfaces of the airfoil divided by the chord length. The upper and lower surfaces of the airfoil are equidistant from the mean line.

In selecting the proper airfoil dimensions and contours for the purposes of this invention resort may be had to families of airfoils established by NASA; or NACA (The National Advisory Committee for Aeronatics, the forerunner of NASA ) in Technical Report No. 610 entitled "Tests of Related Forward-Camber Airfoils in the Variable Density Tunnel" published 1937. In this report the coordinates of the upper and lower surfaces and the aerodynamic characteristics of 51 airfoils are given in terms of the angle of attack. (The angle of attack is the angle between the undisturbed wind direction and the chord of the airfoil).

While the parameters of the airfoils which are most suitable for the purposes of this invention vary considerably due to the different factors involved, such as the height and width of the box-like body and the intended use of the fairing, in general the airfoil should be highly cambered, that is about 6 percent, with a thickness ratio from about 15 to 21 percent.

Airfoil surfaces extending from between about 2% to 7% chord station at the front to between 60% to 100% chord station at the rear are used to shape the surfaces of the fairing. In those cases where the airfoil surface is not extended to the 100% chord point, planar surfaces are substituted at the rear of the fairing, so as to achieve the purposes of this invention.

The fairing of this invention is mounted on and effectively forms a part of the box-like bodies, such that the leading outer contoured surfaces thereof are substantially tangent to at least the side walls of the box-like container. The trailing surfaces of the fairing side walls are then inwardly directed to terminate in a vertical apex 10 at the most rearward end thereof.

It is an important feature of this invention to achieve the desired airflow produced by the fairing while at the same time keeping the length L of the fairing to a minimum in terms of the width W of the box-like body. The length L of the fairing from the rear of the box-like body to the rear apex of the fairing should be no more than the width of said body and preferably about one half the width thereof; that is, the length of the fairing is from about one-half to equal the width of the box-like body or even less. This presents problems when adapting an established airfoil surface to these dimensions. Some established airfoil surfaces, when mounted tangent to the end surfaces of the box-like body may have trailing ends which converge too soon to produce the desired airflow, or too far removed from the rear of the body to be practical. Obviously a rear fairing which protrudes too far behind a trailer is unacceptable.

It is therefore necessary to select an airfoil surface which, when used in the design of the fairing, will converge at a rear apex and in a position which is both practical and yet effective in producing two and preferably three dimensional airflow without air flow separation.

Illustrative airfoil ordinates which may be employed in the design of the fairing of this invention are NACA 23021 and NACA 64021. The first digits 2 and 6, respectively, represent the camber in percent of the airfoil chord i.e. 0.02 C and 0.06 C. The next two digits divided by 2 give the location of the point of maximum camber in percent of the chord as measured from the leading edge of the airfoil. Thus the maximum camber of the two foils selected for illustrative purposes occurs at 0.15 C and 0.20 C respectively. The last two digits 21 in both cases represent the thickness ratio in terms of the chord length.

Figure 4:
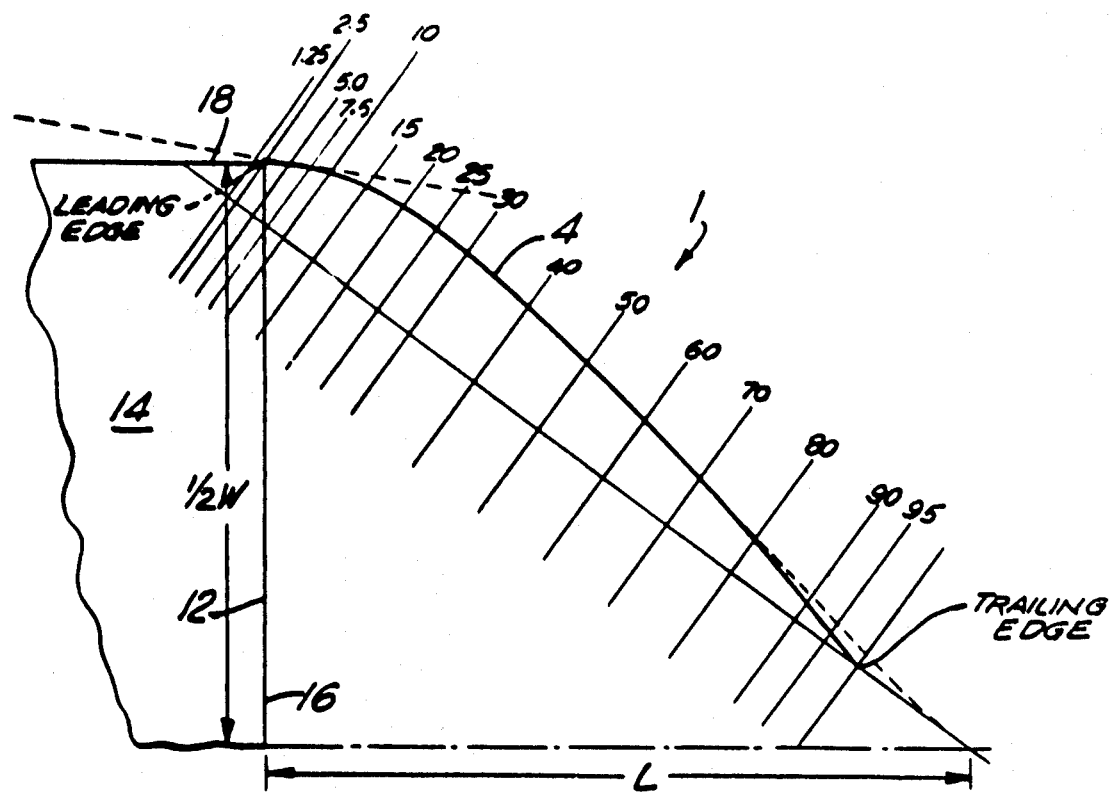
FIG. 4 is a schematic plan view of one half of a fairing and rear of a trailer illustrating the manner in which sidewalls of the fairing may be designed.

Referring to the NACA 23021 airfoil and to FIG. 4 which shows schematically a top plan view of one half of the rear of a trailer 14 and attached fairing, one side 4 of the fairing being formed by said airfoil surface, the forward end 12 of the fairing is adjacent the rear end 16 of the trailer and the leading edge of the airfoil surface 4 is tangent to the side wall 18 of the trailer 14.

In this illustration it is assumed that the widths W of the trailer body and fairing are 8 feet and the desired length L of the fairing is 4 feet. When the airfoil surface 4 is then positioned at a line coincidental with the side wall 18 of the trailer and tangent to the foil at the 2.25 percent chord position, the foil will assume the position as in FIG. 4. A line perpendicular to the tangent line represents the rear 16 of the trailer and forward end 12 of the fairing. As can be seen the center line of the fairing intersects the chord line after the nominal trailing edge. In other words, the full airfoil surface in the position shown was not sufficiently long to intersect the center line and form an apex closing both side walls. To effect such closure there are essentially three alternatives:

(1) Move the point of tangency on the contour as drawn to a more forward position on the airfoil, e.g. about the 1.75 percent chord station;

(2) Recalculate and redesign the entire contour using a larger chord;

(3) Draw a straight line tangent to the contour at about the 70 percent chord station and extending to the center line of the fairing, as shown in FIG. 4.

Figure 5:
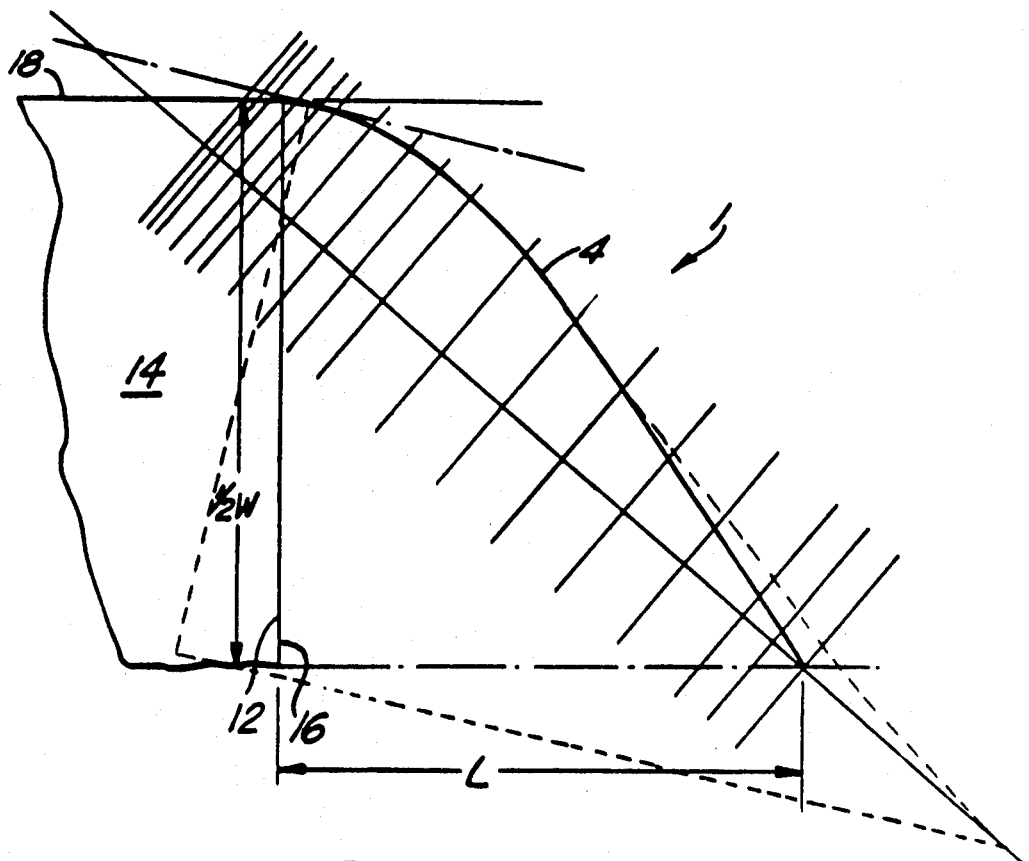
FIG. 5 is a view similar to FIG. 4.

In the case of the NACA 64021 airfoil used in FIG. 5 the trailer side is shown tangent to the airfoil contour at approximately the 4 percent chord station and the trailing edge of the airfoil intersects the center line of the fairing as preferred. To illustrate the importance of the relationship between the airfoil and its point of tangency with the trailer, FIG. 5 also shows an airfoil wherein the point of tangency is at about the 7 percent chord station. The trailer side, rear end and fairing center line (all shown in broken lines) are thereby effectively rotated clockwise. The result is that the chord line and the fairing center line intersect far aft of the desired apex. Then if a straight line were then drawn tangent to the airfoil at about the 60 percent chord station, the length of the fairing would be in excess of that desired for practical use of the fairing.

It will then be appreciated that the designing of a truly aerodynamic fairing which is practical for use on trailers and the like involves a careful selection of sensitive design parameters. Clearly, it is desirable to construct a fairing having a length as short as possible, to avoid any traffic hazzard and facilitate ease of handling, especially when the fairing is designed for detachable use. On the other hand, the fairing should be long enough to permit use of airfoil contours to the maximum possible extent if the desired airflow and drag reduction are to be achieved. Thus, it may be necessary to compromise one of these factors in favor of the other. For example, in order to obtain the smallest length to width ratio in the fairing, it may not be possible to utilize the entire airfoil contour but only a substantial portion thereof. Thus, as shown in FIGS. 4 and 5, the portions of the airfoils utilized at the point of tangency with the trailer sidewalls starts at the 2.25 percent and 4 percent chord stations, respectively; and in one case (FIG. 4) it is possible to utilize the balance of the airfoil only up to the 70 percent chord station, at which the surface may become planar and continue to the apex of the fairing. In the other illustrative case of FIG. 5 the entire remainder of the airfoil from the 4 percent chord station to the 100 percent trailing edge is utilized for the contoured surfaces of the fairing, which is to be preferred.

The foregoing also applies for the most part to the embodiment of FIG. 2 which shows in addition contoured top and bottom surfaces of the fairing. In this embodiment it is intended that the top and bottom contoured surfaces sufficiently converge on one another only to create three dimensional airflow without flow separation and terminate at the apex formed by the side walls while retaining a substantial portion of the vertical apex 10, in terms of say from about ⅓ to ⅔ the height of the box-like container.

For this purpose the top and bottom contours may be designed by reference to the same or similar airfoils utilized for the design of the side contours of the fairing. The leading portions of the airfoils utilized for the top and bottom surfaces are tangent to the top and bottom flat surfaces of the box-like bodies, but less of the leading surfaces of the airfoil are utilized in order to ensure less convergence of the trailing surfaces than in the case of the side walls which terminate in an apex. Accordingly, the top and bottom surfaces of the airfoils utilized may be tangent to the top and bottom faces of the box-like bodies at from about the 10 percent to 12 percent chord stations of the foils used in the design of the fairing.

It should be noted that, while reference is made herein to the side walls of the fairing terminating in an apex, it is not necessarily intended that this be a sharp apex, but rather that the apex as well as the various intersections of the side, top and bottom walls of the fairing be rounded with generous radii on the outer portions thereof.

Figure 6:
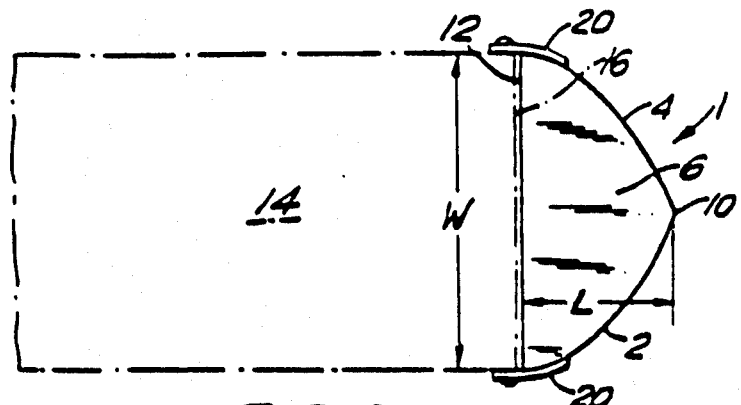
FIG. 6 is a schematic top plan view of a truck trailer provided with a fairing according to FIG. 1.
Figure 7:
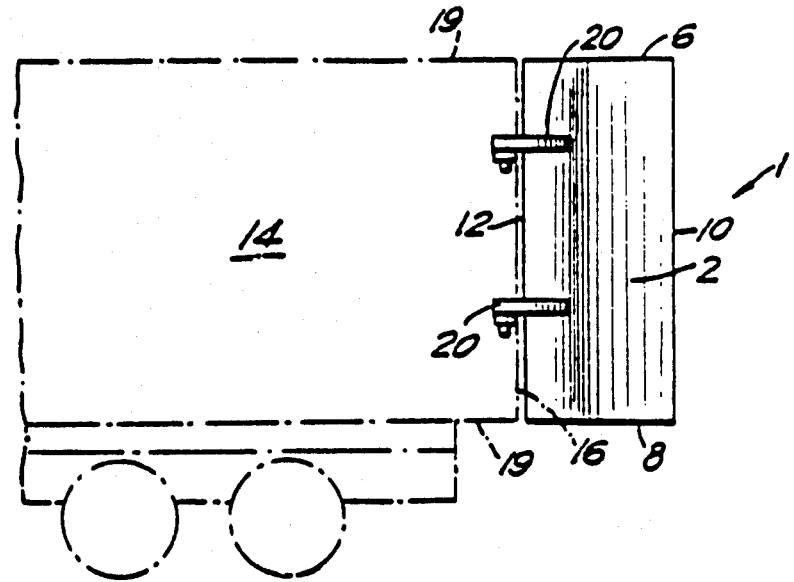
FIG. 7 is a side elevational view thereof.
Figure 8:
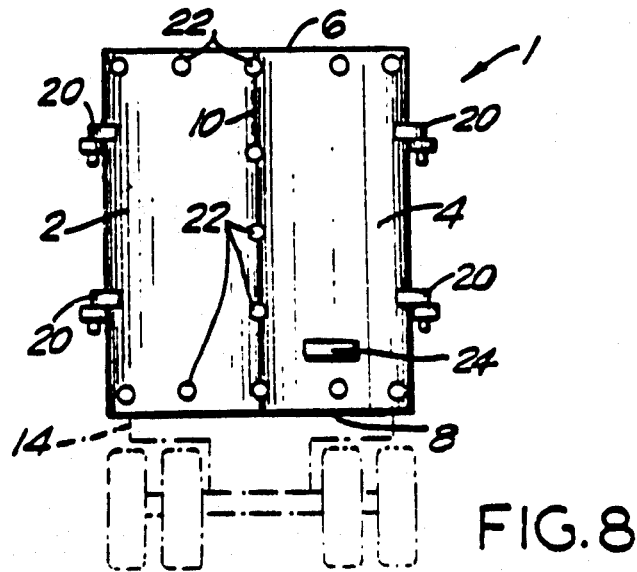
FIG. 8 is a rear end elevational view thereof.

Referring now to FIGS. 6-9, FIG. 6 shows a top plan view of a fairing 1 detachably mounted on the rear body 14 of a truck trailer by attachment means 20. As can be seen from FIG. 6, the sides 2 and 4 of the fairing 1 are aerodynamically contoured and terminate rearwardly in a vertical apex 10, as shown also in FIG. 1, the top and bottom surfaces of the fairing 1 being flat as shown in FIGS. 7 and 8, FIG. 7 being a side elevational view and FIG. 8 being an end elevational view of FIG. 6. As seen in FIG. 8, the fairing may be provided with lights 22 as required by Federal and State agencies and one or more indents 24 for license plates and suitable wiring for same (not shown).

Figure 9:
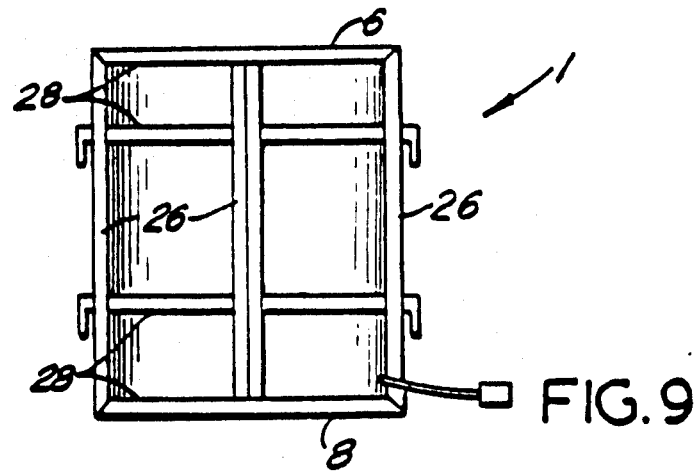
FIG. 9 is a front elevational view showing the interior of the fairing of FIGS. 6–8.

The interior of fairing 1 as seen from the front thereof is shown in FIG. 9. Thus the fairing, which is constructed of a substantially rigid light weight plastics or metal skin may be internally reinforced by upright numbers 26 and horizontal frames 28 to lend further rigidity to the skin if necessary.

The fairing 1 is detachably mounted on trailer 14 with sufficient clearance, say about ¼ inch, to facilitate ease of attachment and detachment of the fairing to the trailer, although a soft foam elastomeric strip may be used to minimize air flow through the gap thus formed between the two members.

The top plan view of the embodiment of FIG. 2 is substantially as shown in FIG. 6, which shows a corresponding view of the FIG. 1 embodiment.

Figure 10:
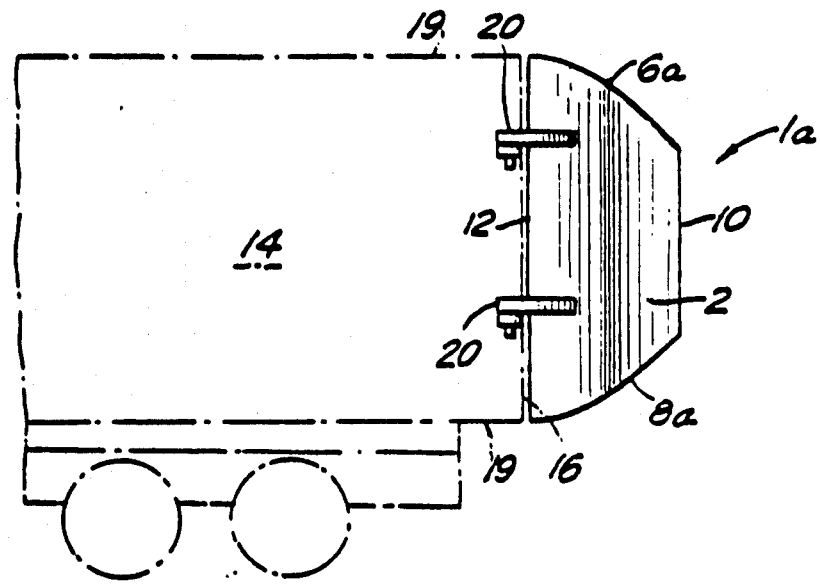
FIG. 10 is a schematic side elevational view of a trailer provided with a fairing according to FIG. 2.
Figure 11:
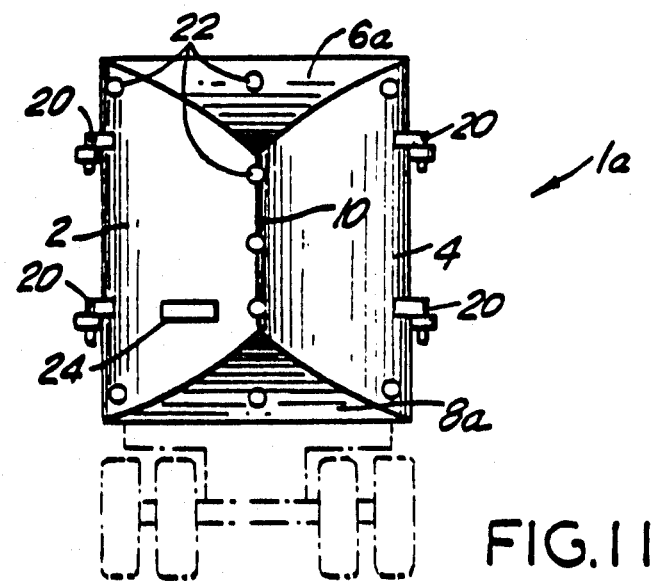
FIG. 11 is a rear end elevational view thereof.

The side and rear elevational views of the embodiment of FIG. 2 are shown in FIGS. 10 and 11 respectively.

Referring now to FIGS. 10 and 11, it will be seen that the essential differences between these figures and FIGS. 7 and 8 is the provision of top 6a and bottom 8a contoured surfaces, the leading edges of which are tangent to the top and bottom walls 19 of the trailer with the trailing edges of such surfaces terminating at the vertical apex 10 formed by the two sides 2 and 4 of fairing 1. This structure induces three dimensional airflow when mounted on the trailer, even when operated at relatively high speeds.

Various means 20 may be utilized for detachably mounting the fairing 1 to a trailer body 14 or similar box-like body.

Figure 12:
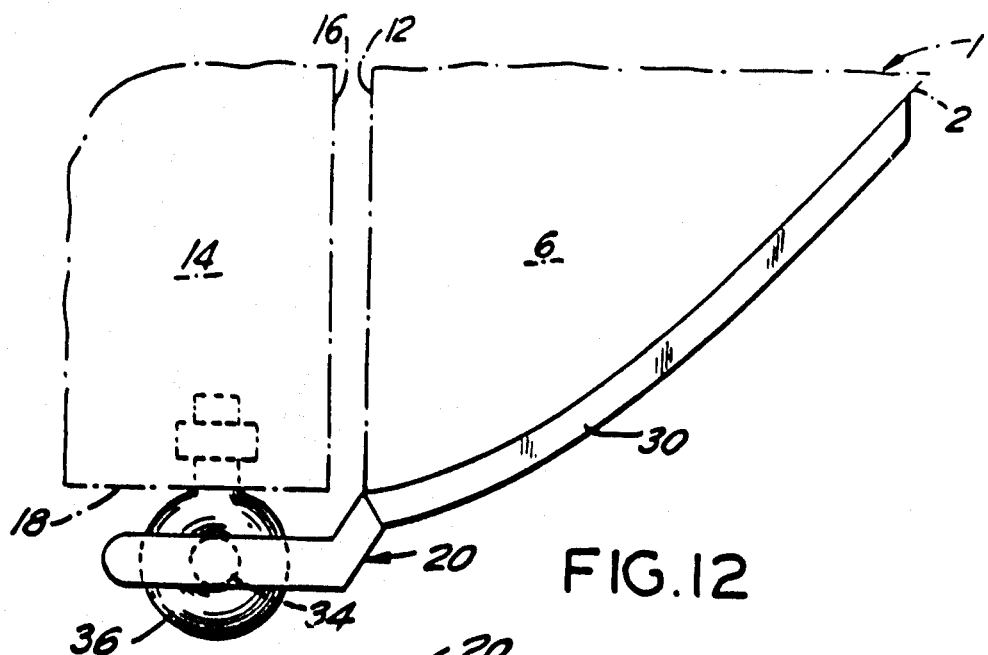
FIG. 12 is a top plan view of one means for mounting the fairing 1 to a trailer 14.
Figure 13:
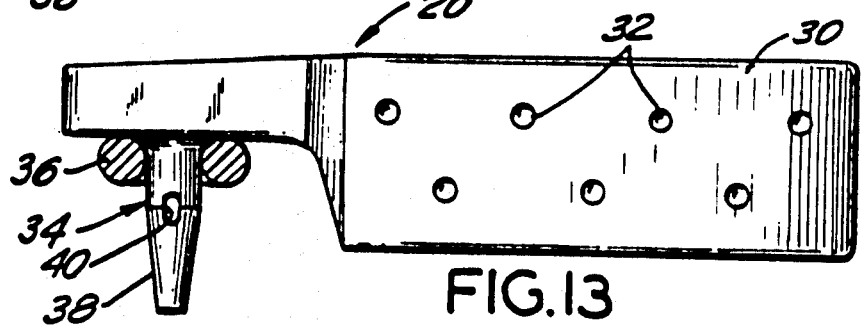
FIG. 13 is a side elevational view thereof, partly in section.

In FIGS. 12 and 13 there is shown a strap-like bracket 30 riveted to the outer side walls 2 and 4 of fairing 1 by counter-sunk rivets 32 and ending adjacent the side walls 18 of the trailer body in a depending pin 34 adapted to be received freely within an eyelet 36 mounted externally of the side wall 18 of trailer 14. The lower portion of pin 34 is tapered at 38 to facilitate assembly and provided with a hole 40 for locking the pin in place by means not shown.

Figure 14:
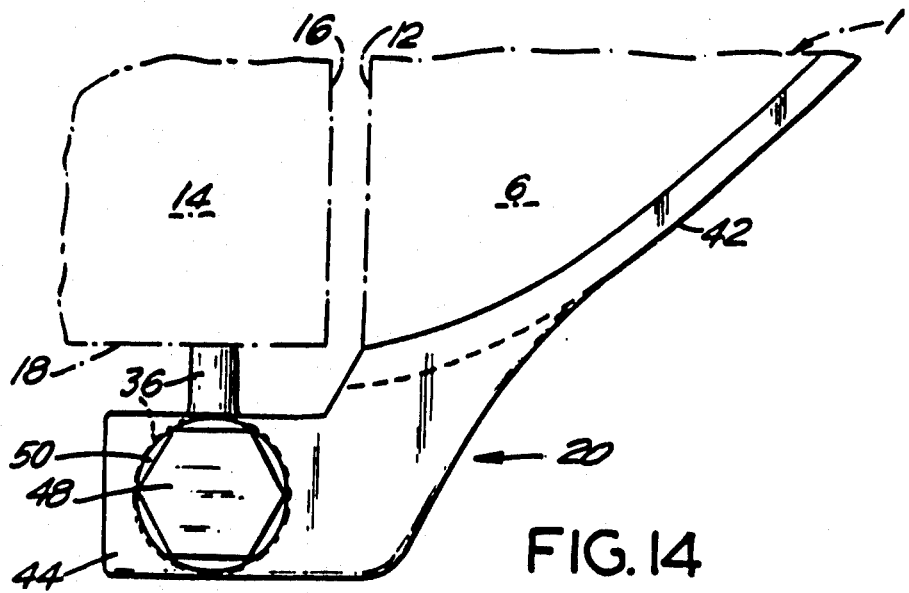
FIG. 14 is a top plan view of another means of mounting the fairing 1 to a trailer 14.
Figure 15:
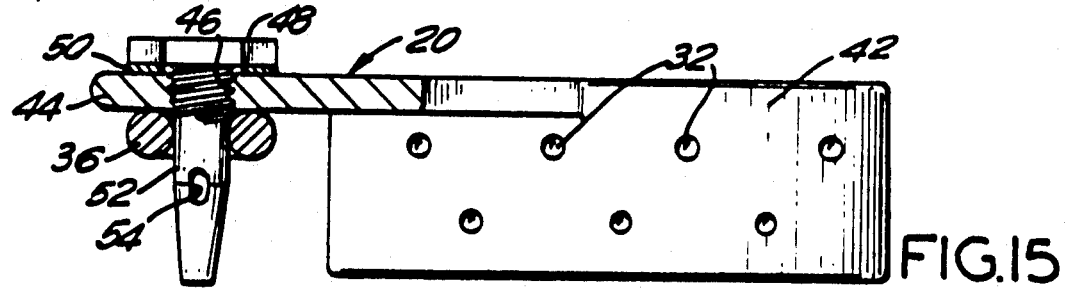
FIG. 15 is a side elevational view thereof, partly in section.

The embodiment of FIGS. 14 and 15 shows a similar strap 42 affixed to the fairing by rivets 32 and terminating in a flange 44 adjacent the side wall 18 of the trailer which is likewise provided with an eyelet 36. Flange 44 is further threaded at 46 to receive a hexagonal bolt 48 partially threaded as indicated to cooperate with the threaded flange and with the aid of a lock washer 50 to lock the bolt to the flange 44. The lower portion of the bolt is tapered at 52 to facilitate assembly and provided with a hole 54 to accommodate locking means not shown. The foregoing structure is particularly useful when it is desired to use one pair of fittings as a hinge to rotate the fairing about same after removing the pins of the other side of the fairing.

The attachment means of FIGS. 16 to 20 utilizes a similar strap 56 terminating in a flange 58 provided with a downwardly tapered hole 60 for alignment with the hole in eyelet 36. Flange 58 is provided with a depending skirt 62 which is arcuately shaped to conform to the outer diameter of eyelet 36 with sufficient clear therebetween to freely fit over the same and extend up to about one fourth of the outer circumference thereof to facilitate assembly.

Figure 17:
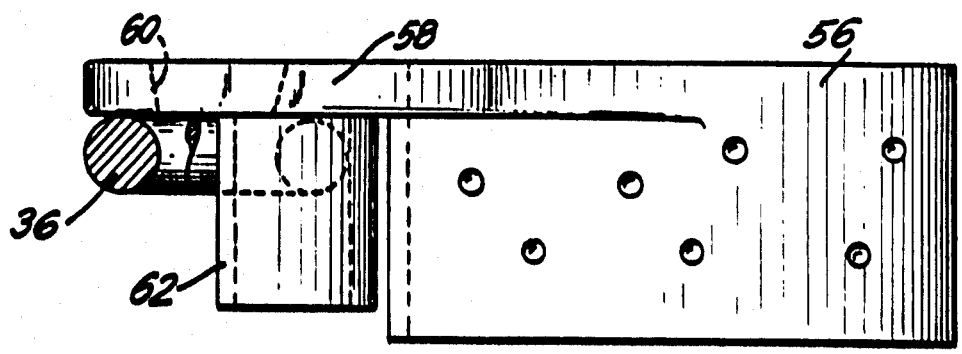
FIG. 17 is a side elevational view partly in section of a top bracket of FIG. 16.

The depth of skirt 62 on upper flange 58 extends well beyond the vertical diameter of the torus forming the eyelet, at least twice its diameter, to facilitate alignment of the upper flanges 58 with the upper eyelets 36, as shown in FIG. 17. The depth of skirt 62' on the lower flanges 58' is much less, and indeed just sufficient to embrace the vertical diameter of the torus forming the eyelet, thereby to permit a pin and locking means to be attached beneath the eyelet, as shown in FIGS. 18 and 19.

Figure 16:
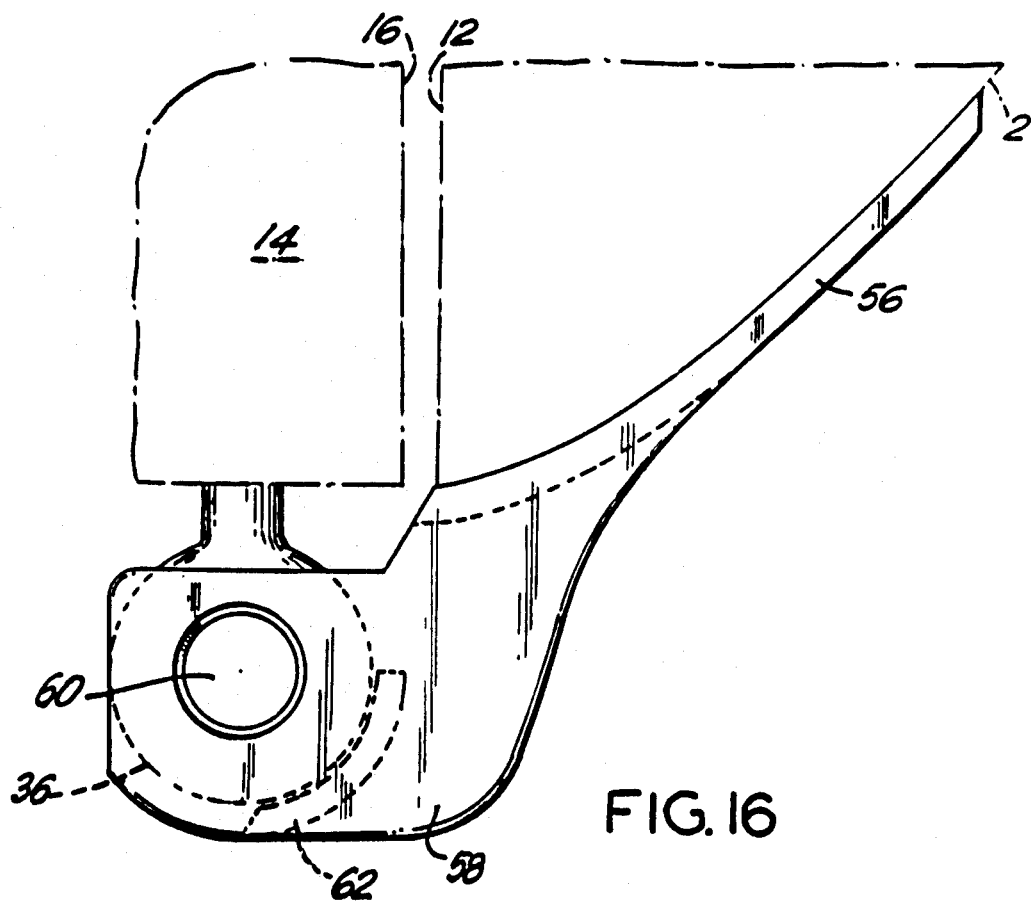
FIG. 16 is a top plan view of yet another means for mounting the fairing 1 to a trailer 14.
Figure 19:
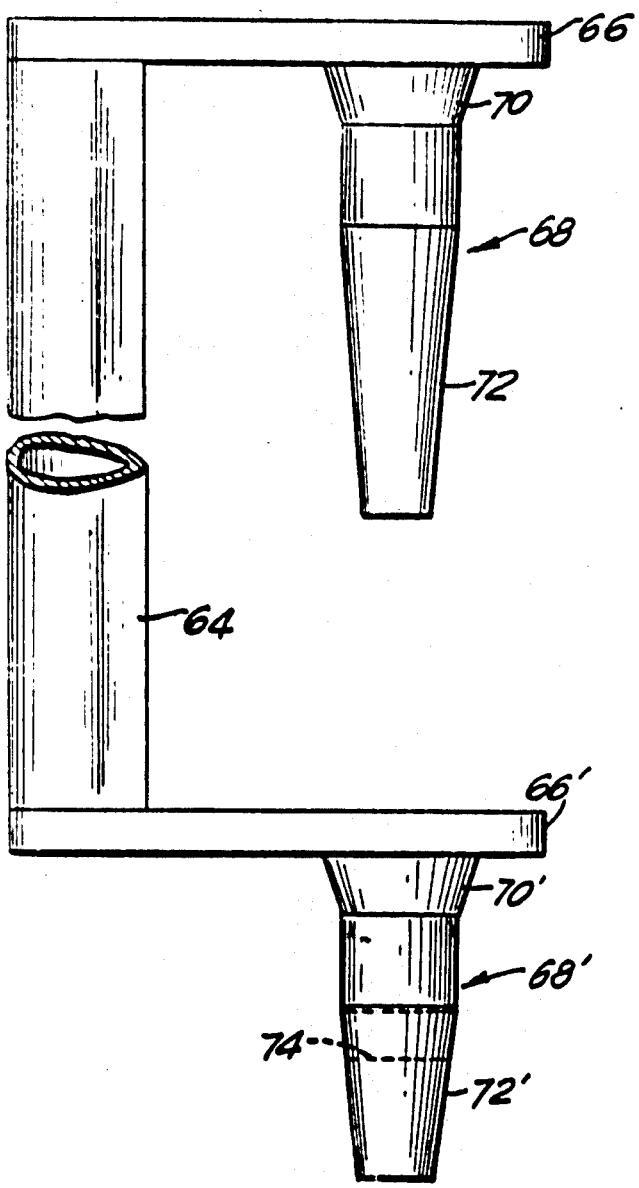
FIG. 19 is a side elevational of attachment means for use with the brackets of FIGS. 16-18.
Figure 18:
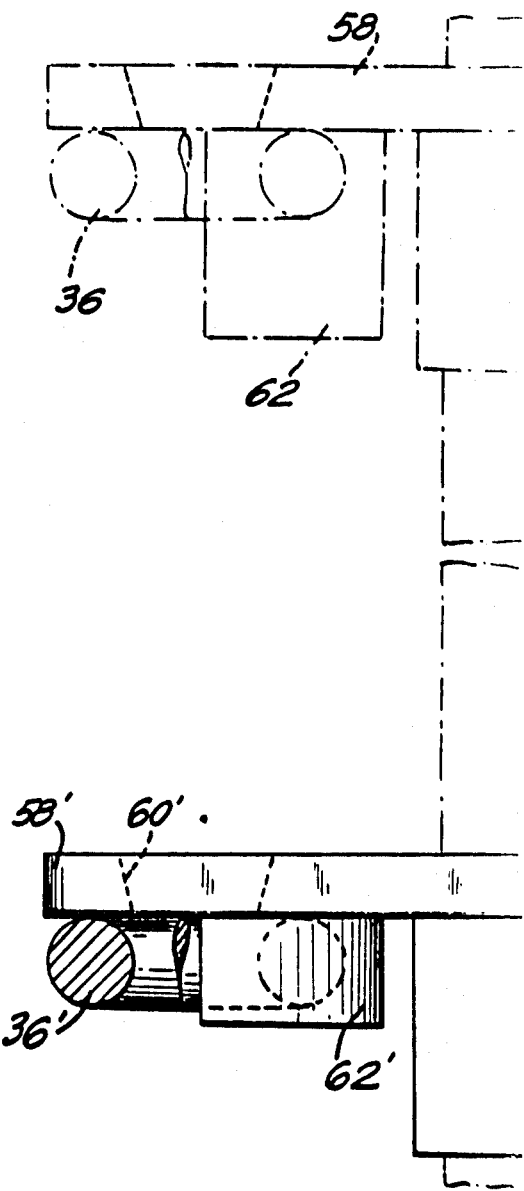
FIG. 18 is a side elevational view partly in section of a bottom bracket of FIG. 16.
Figure 20:
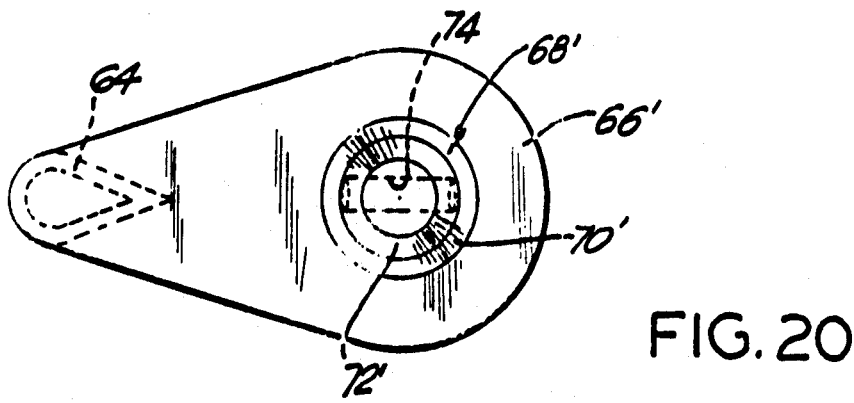
FIG. 20 is a bottom plan view of the attachment means of FIG. 19.

FIGS. 19 and 20 (elevational and bottom plan views, respectively) show an attachment structure for use in cooperation with the structure of FIGS. 16-18, the purpose of which is to provide convenient means for attaching and detaching the fairing to and from the trailer and rotating the same about the trailer by a worker at ground level. For this purpose the lowermost brackets on both sides of the trailer and fairing should preferably be located no more than about 6 feet above ground level.

The attachment structure of FIG. 19 comprises a vertical pipe or tube 64, streamlined in cross section, supporting at top and bottom two horizontal members 66 and 66' which in turn support two depending pins 68 and 68', respectively. Each pin is tapered initially at 70 and 70' to cooperate with tapered holes 60 in flanges 58; and further tapered therebeneath at 72 and 72' to facilitate guiding the same into holes 60. The shank of the lower pin 68' is shorter than that of the upper pin 68 for the same reason. The vertical distances between the lower faces of the upper and lower pin-supporting members should exceed the vertical distance between the upper surfaces of the fairing flanges by an amount to provide sufficient clearance to facilitate assembly. The lower pin 72' is preferably provided with a hole 74 beneath the position of the lower eyelet to permit the introduction of locking means not shown.

Reference has been made to the use of the fairing of this invention on the rear of box-like bodies transported by rail in piggyback manner. It is further contemplated that in accordance with this invention a front fairing, not shown, may be mounted on said bodies to reduce wind resistance, such a fairing taking the form of a hemi-cylindrical body having a convex forward portion and flat top and bottom portions, and further provided with detachable mounting means as described herein.

Resort may be had to such modifications and equivalents as fall within the spirit of the invention and the scope of the claims hereinafter made.

What is claimed is:

1. A detachable rear fairing to reduce the drag incident to relatively high speed ground transportation of a box-like comprising a compact uncollapsible, substantially rigid light-weight structure mountable adjacent the rear of said body during transportation thereof and forming forward top, bottom, and two side outer surfaces in substantially the same plane as the outer surfaces of said box-like body, the two outer side surfaces and the top and bottom surfaces of said fairing being convexly contoured in the form of the upper surfaces of an air foil having the leading surfaces thereof each tangent to the outer side, top and bottom walls of the box-like body, and the trailing outer surfaces thereof intersecting and terminating in a vertical apex of a height from about ¼ to ⅜ the height of said box-like body, said apex extending from above a plane coextensive with the outer bottom wall of said box-like body to below a plane co-extensive with the outer top wall of said box-like body, the length of said fairing from the box-like body to said apex being from about ¼ to equal the width of said box-like body, said outer surfaces being derived from a highly cambered aerodynamic air foil having a high thickness ratio and selected to provide smooth three dimensional airflow without flow separation, and means for detachably mounting the fairing on said body.

2. A fairing according to claim 1, wherein said leading surfaces are tangentially located at about at least 3 percent of the foil in terms of its chord length to form the convexly contoured outer surfaces of the fairing.

3. A fairing according to claim 2, wherein about 5 to 70 percent of the airfoil in terms of its chord length comprises the contoured outer surfaces of the fairing, the remainder of the trailing surfaces being substantially planar and terminating in said apex.

4. A fairing according to claim 1, wherein said means for mounting said fairing on said body are detachable and comprise at least two vertically aligned brackets mounted on the outside surface of said box-like body, each provided with a vertical hole for receiving a vertical securing member, correspondingly aligned brackets on said fairing each provided with a vertical hole cooperating with and forming paired holes with the corresponding brackets on said box-like body, and vertical securing members passing through the holes of each pair of correspondingly aligned brackets to secure the fairing during movement of the resulting structure.

5. A fairing according to claim 4, wherein the brackets on said box-like body are in the form of eyelets and the brackets on said fairing are provided with a threaded hole adapted to receive a threaded bolt, the shank of which, below a portion thereof passing below said eyelet, is tapered and provided with a hole for receiving locking means to secure the bolt in place during movement of the resulting structure.

6. A fairing according to claim 4, wherein at least one side of said box-like body is provided with at least two vertically aligned brackets provided with holes for receiving downwardly disposed tapered hinge pins supported on brackets affixed to a vertical member which can be manually lowered to secure said pins and structure and elevated to release and remove the fairing.

7. A fairing according to claim 4, wherein the brackets on said box-like body are in the form of eyelets and the brackets on said fairing are each provided with a depending skirt arcuately conforming to the eyelets and extending about a portion of the outer perimeter thereof to facilitate alignment of the fairing brackets and vertical holes with the eyelets.

8. A box-like truck body having mounted on the rear thereof a fairing according to claim 1.

9. A piggy-back railroad cargo container having mounted on the rear thereof, between successive railroad cars, a fairing according to claim 1.

10. A piggy-back railroad truck trailer having mounted on the rear thereof between successive railroad cars a fairing according to claim 1.

11. A piggy-back railroad truck trailer having mounted on the rear thereof at the end of successive railroad cars a fairing according to claim 1.

* * * * *